US012624512B2

(12) United States Patent
Barnes

(10) Patent No.: US 12,624,512 B2
(45) Date of Patent: May 12, 2026

(54) ADJUSTABLE PILE GUIDE

(71) Applicant: Sean Barnes, Mt. Pleasant, SC (US)

(72) Inventor: Sean Barnes, Mt. Pleasant, SC (US)

( * ) Notice: Subject to any disclaimer, the term of this patent is extended or adjusted under 35 U.S.C. 154(b) by 422 days.

(21) Appl. No.: 18/197,781

(22) Filed: May 16, 2023

(65) Prior Publication Data

US 2024/0384491 A1     Nov. 21, 2024

(51) Int. Cl.
| | |
|---|---|
| *E02D 13/04* | (2006.01) |
| *E02B 3/06* | (2006.01) |
| *E02D 5/54* | (2006.01) |
| *F16M 13/02* | (2006.01) |

(52) U.S. Cl.
CPC .............. *E02D 13/04* (2013.01); *E02B 3/064* (2013.01); *E02D 5/54* (2013.01); *F16M 13/022* (2013.01)

(58) Field of Classification Search
CPC ........... E02D 13/04; E02D 5/54; E02B 3/064; F16M 13/022
See application file for complete search history.

(56) References Cited

U.S. PATENT DOCUMENTS

| | | | |
|---|---|---|---|
| 3,074,239 | A | 1/1963 | Mustard |
| 3,270,698 | A | 9/1966 | Fort |
| 3,559,947 | A | 2/1971 | Sette |
| RE27,090 | E | 3/1971 | Rutter |
| 3,603,276 | A | 9/1971 | De Lisle |
| 3,727,415 | A | 4/1973 | Williams |
| 3,967,570 | A | 7/1976 | Bradfield |

| | | | |
|---|---|---|---|
| 4,018,179 | A | 4/1977 | Rutter |
| 4,072,119 | A | 2/1978 | Williams |
| 4,276,849 | A | 7/1981 | Bloxham |
| 4,280,429 | A | 7/1981 | Wells |
| 4,510,877 | A | 4/1985 | Bloxham |
| 4,641,595 | A | 2/1987 | Pritchett |
| 4,763,592 | A | 8/1988 | Russ |
| 4,782,778 | A | 11/1988 | Barbaglia |
| 5,002,000 | A | 3/1991 | Rutter |

(Continued)

FOREIGN PATENT DOCUMENTS

| | | | |
|---|---|---|---|
| CN | 206916745 U | * | 1/2018 |
| DE | 2042850 | | 3/1972 |

(Continued)

OTHER PUBLICATIONS https://www.jetdock.com (excerpt printed Jan. 29, 2020).

(Continued)

*Primary Examiner* — Amber R Anderson
*Assistant Examiner* — Stacy N Lawson
(74) *Attorney, Agent, or Firm* — Bill Killough

(57) ABSTRACT

A pile guide has a cylinder having a central aperture therein, and constructed and arranged to receive a pile through the central aperture of the cylinder. Opposing wings extend generally vertically, such as from a side of a floating object. Flanges of a retainer extend from opposite sides of the retainer and slide within slots in the wings to provide adjustability of the pile guide by allowing movement of the cylinder relative to the dock or other floating object. Upon positioning the cylinder with the pile in the cylinder, the retainer or retainer is fixed in place relative to the wings. The distance of the cylinder from the floating dock is set to accommodate for variable distances of piles from the floating dock or floating object.

20 Claims, 7 Drawing Sheets

(56)

References Cited

U.S. PATENT DOCUMENTS

| | | | |
|---|---|---|---|
| 5,016,551 | A | 5/1991 | Peck et al. |
| 5,046,897 | A | 9/1991 | Ray |
| 5,140,922 | A | 8/1992 | Bowman et al. |
| 5,394,814 | A | 3/1995 | Rutter et al. |
| 5,549,070 | A | 8/1996 | Cruchelow et al. |
| 5,664,513 | A | 9/1997 | Echelbarger |
| 5,826,528 | A | 10/1998 | Jancsek |
| 5,860,379 | A | 1/1999 | Moody |
| 5,860,765 | A | 1/1999 | Cruchelow et al. |
| 5,941,660 | A | 8/1999 | Rueckert |
| 6,145,463 | A | 11/2000 | Zeilinger |
| 6,179,525 | B1 | 1/2001 | Gruhn et al. |
| 6,477,968 | B2 | 11/2002 | Powell |
| 6,547,485 | B2 | 4/2003 | Elson |
| D506,668 | S | 6/2005 | Black |
| 7,153,064 | B2 | 12/2006 | Zeilinger et al. |
| 7,390,141 | B2 | 6/2008 | Rytand |
| 7,406,924 | B1 | 8/2008 | Impey |
| 8,267,621 | B1 | 9/2012 | Way |
| 9,132,897 | B2 | 9/2015 | Barnes et al. |
| 9,352,812 | B1 | 5/2016 | Barnes et al. |
| D758,554 | S | 6/2016 | Lohmann |
| 9,487,925 | B1 | 11/2016 | Meriweather et al. |
| 9,604,709 | B2 | 3/2017 | Barnes |
| D826,702 | S | 8/2018 | Barnes et al. |
| D828,746 | S | 9/2018 | Barnes et al. |
| D828,747 | S | 9/2018 | Barnes et al. |
| 10,086,919 | B2 | 10/2018 | Barnes |
| D837,041 | S | 1/2019 | Barnes et al. |
| 10,267,003 | B2 | 4/2019 | Barnes et al. |
| 10,370,073 | B2 | 8/2019 | Barnes |
| D899,901 | S | 10/2020 | Barnes |
| D899,902 | S | 10/2020 | Barnes |
| D899,903 | S | 10/2020 | Barnes et al. |
| D899,904 | S | 10/2020 | Barnes et al. |
| 10,822,063 | B1 | 11/2020 | Barnes |
| 11,447,216 | B2 | 9/2022 | Barnes |
| 2002/0131821 | A1 | 9/2002 | Elson |
| 2005/0002741 | A1 | 1/2005 | Brensinger et al. |
| 2005/0271477 | A1 | 12/2005 | Sehl |
| 2006/0156964 | A1 | 7/2006 | Canniffe et al. |
| 2007/0248420 | A1 | 10/2007 | Jacobs et al. |
| 2008/0014028 | A1 | 1/2008 | Faires et al. |
| 2008/0276851 | A1 | 11/2008 | Weed |
| 2008/0306642 | A1 | 12/2008 | Figura et al. |
| 2009/0235857 | A1 | 9/2009 | Hodapp |
| 2011/0146554 | A1 | 6/2011 | Wright et al. |
| 2011/0274502 | A1 | 11/2011 | Tibedo et al. |
| 2011/0277675 | A1 | 11/2011 | Thom et al. |
| 2014/0010593 | A1 | 1/2014 | Davis |
| 2016/0368577 | A1 | 12/2016 | Gaveau |
| 2020/0115867 | A1 | 4/2020 | Kirby |
| 2020/0370261 | A1* | 11/2020 | Barnes .................... E02B 3/064 |
| 2021/0039761 | A1* | 2/2021 | Barnes .................... B63B 35/38 |
| 2021/0214059 | A1* | 7/2021 | Barnes ..................... B63C 1/02 |
| 2022/0136201 | A1* | 5/2022 | Barnes .................... E02D 13/04 |
| | | | 405/221 |

FOREIGN PATENT DOCUMENTS

| | | |
|---|---|---|
| FR | 2860819 | 4/2005 |
| FR | 3017595 | 6/2014 |
| RU | 2529124 | 9/2014 |
| WO | WO1999014110 | 3/1999 |
| WO | WO2014035026 | 3/2014 |
| WO | WO2016053208 | 4/2016 |

OTHER PUBLICATIONS

Shoremaster, LLC, Official RhinoHoist Front Mount Floating Boat Life Video, YouTube, May 10, 2013, https://www.youtube.com/watch?v-ayxgoTHCijl.

\* cited by examiner

ADJUSTABLE PILE GUIDE

BACKGROUND OF THE INVENTION

Floating docks are used to provide dockage for vessels. Floating docks accommodate changes in water levels by floating in water. Other floating objects are similarly held in place in a body of water by piles. The piles are attached to floating article or dock by pile guides that permit vertical movement of the floating object or dock within the body of water but substantially prevent horizontal movement of the floating object or dock.

Piles driven into the earth are used to hold the dock in position. Piles are typically not driven with precision. There is a need for a pile guide that can be adjusted relative to the floating object and the pile to accommodate for the variable distance of the piles from the dock or other floating object.

SUMMARY OF THE INVENTION

A pile guide has a cylinder having a central aperture therein, and constructed and arranged to receive a pile through the central aperture of the cylinder. Opposing wings extend generally vertically, such as from a side of a floating object. Flanges of a retainer extend from opposite sides of the retainer and slide within slots in the wings to provide adjustability of the pile guide by allowing movement of the cylinder relative to the dock or other floating object. Upon positioning the cylinder with the pile in the cylinder, the retainer or retainer is fixed in place relative to the wings. The distance of the cylinder from the floating dock is set to accommodate for variable distances of piles from the floating dock or floating object.

BRIEF DRAWING DESCRIPTION

DETAILED DESCRIPTION OF PREFERRED EMBODIMENTS

Figure 1:
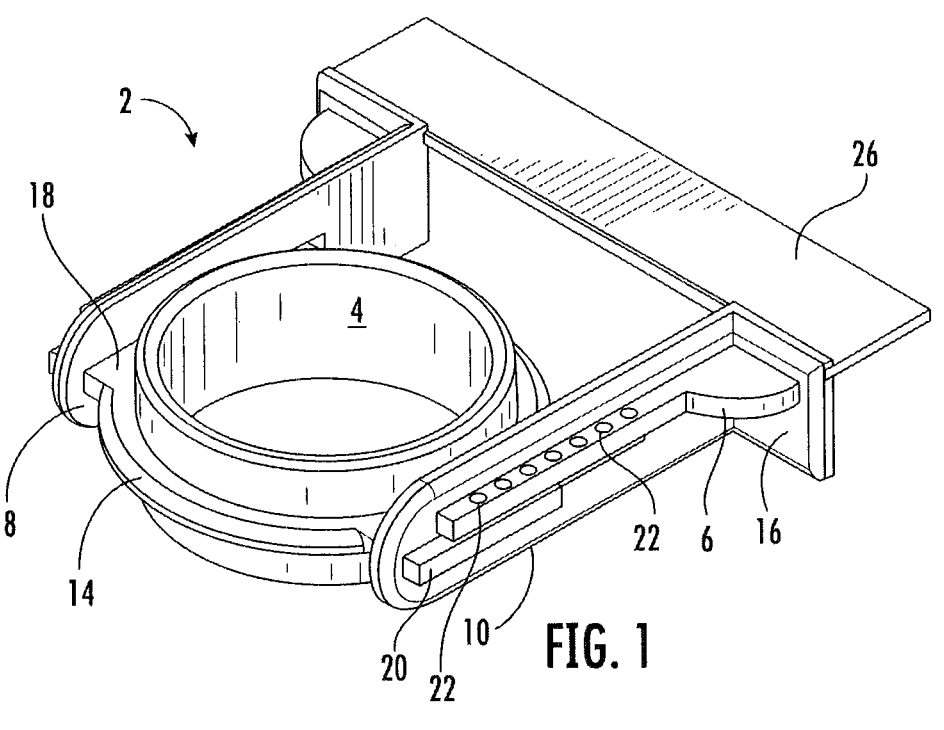
FIG. 1 is a perspective view showing an adjustable pile guide with an adjustable mounting.
Figure 2:
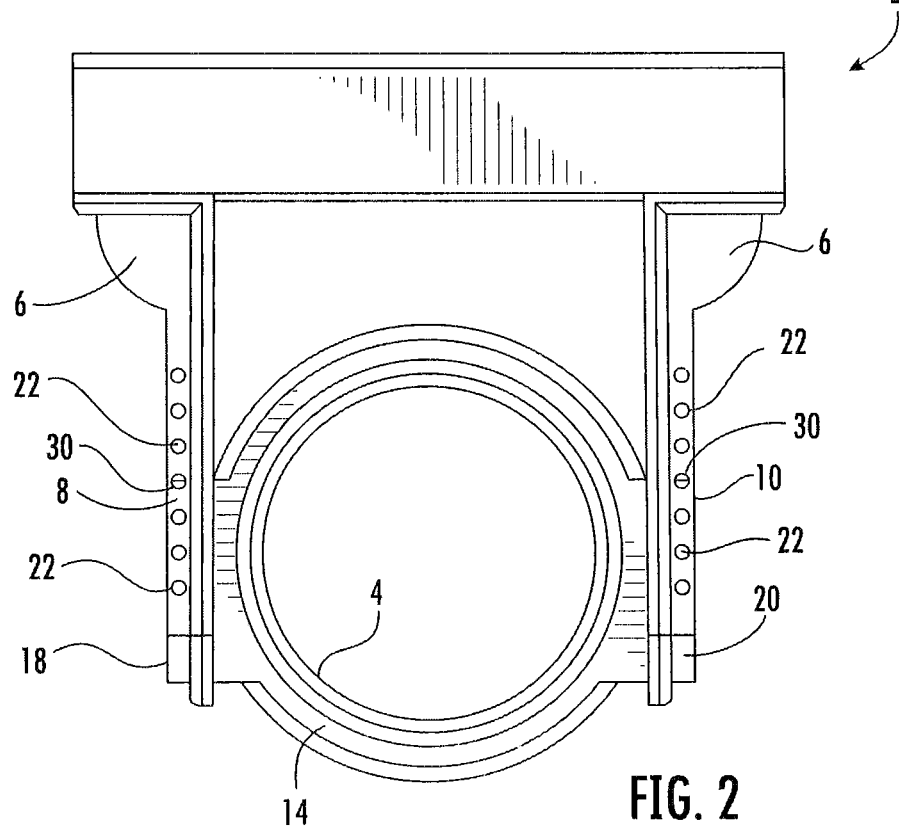
FIG. 2 is a top plan view of the adjustable pile guide of FIG. 1.
Figures 3, 4, 5, 6:
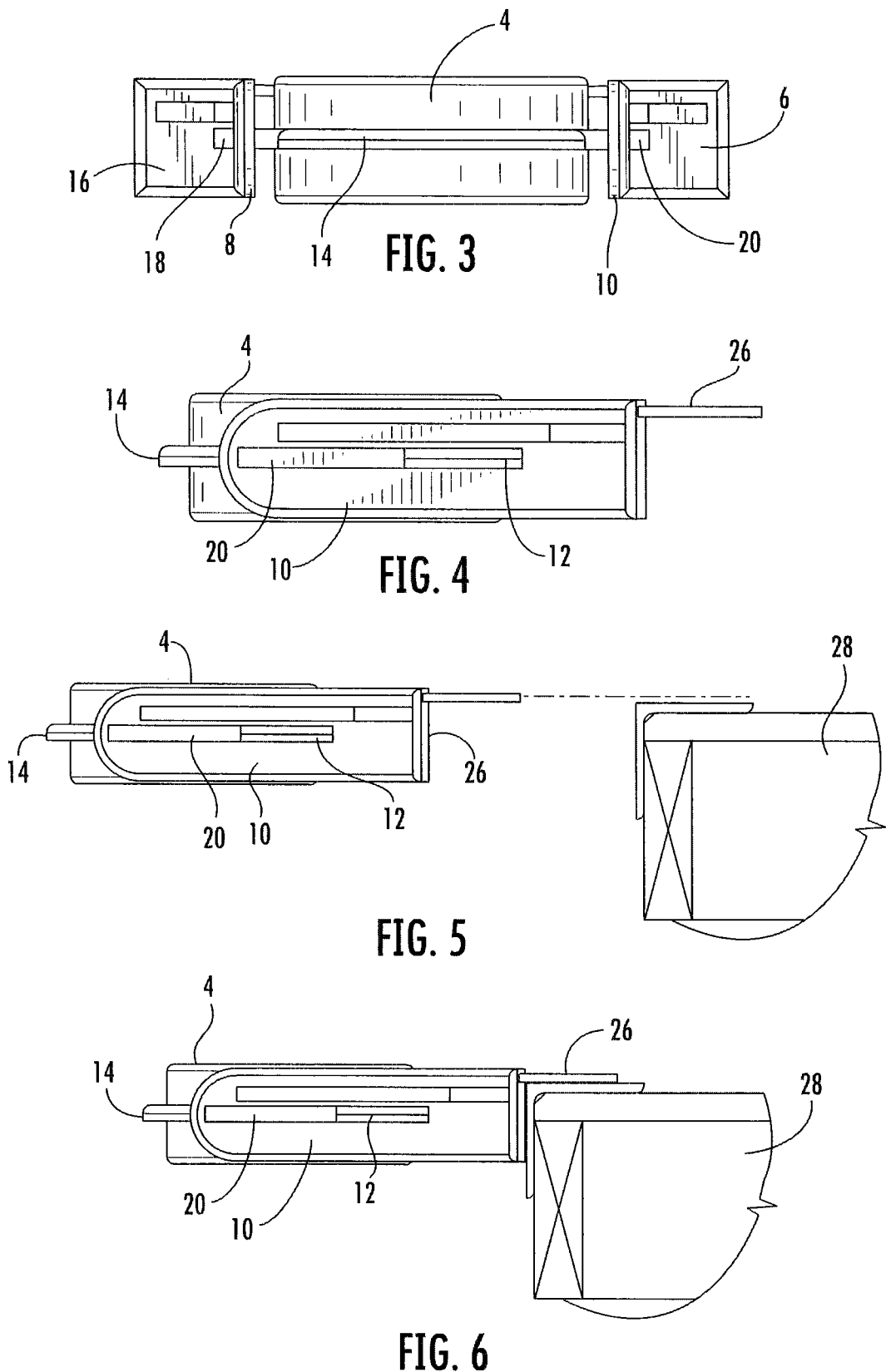
FIG. 3 is a front elevation of the adjustable pile guide of FIG. 1.
FIG. 4 is a side elevation of the adjustable pile guide of FIG. 1.
FIG. 5 is the side elevation of the adjustable pile guide of FIG. 4, and shows one embodiment of mounting the adjustable pile guide to a dock.
FIG. 6 is the side elevation of the adjustable pile guide of FIG. 5, and shows one embodiment of the adjustable pile guide mounted to a dock.
Figure 7:
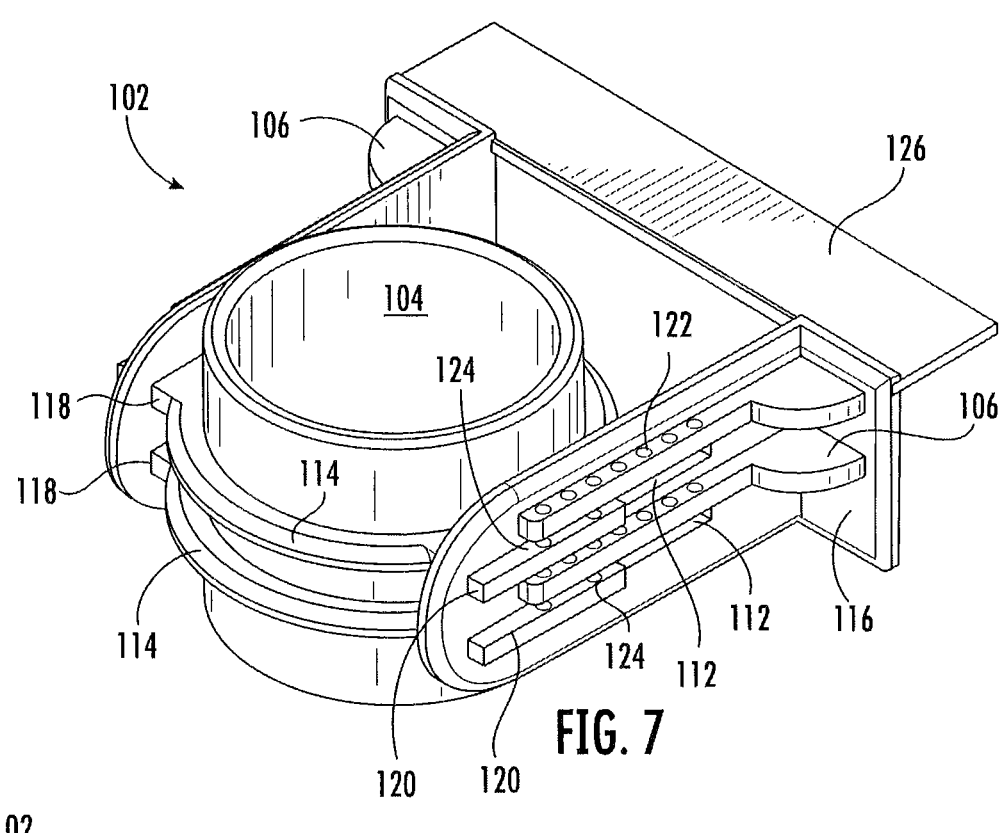
FIG. 7 is a perspective view showing an adjustable pile guide with an adjustable mounting having multiple retainers for the cylinder.
Figure 8:
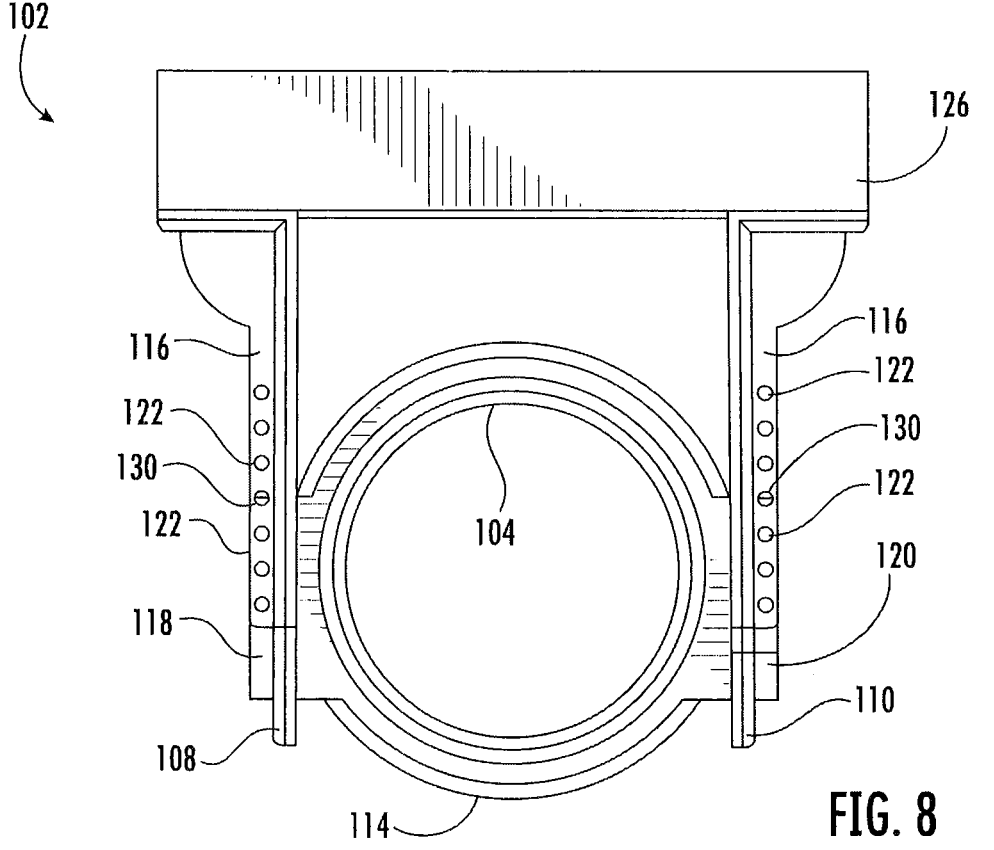
FIG. 8 is a top plan view of the adjustable pile guide of FIG. 8.
Figures 9, 10, 11:
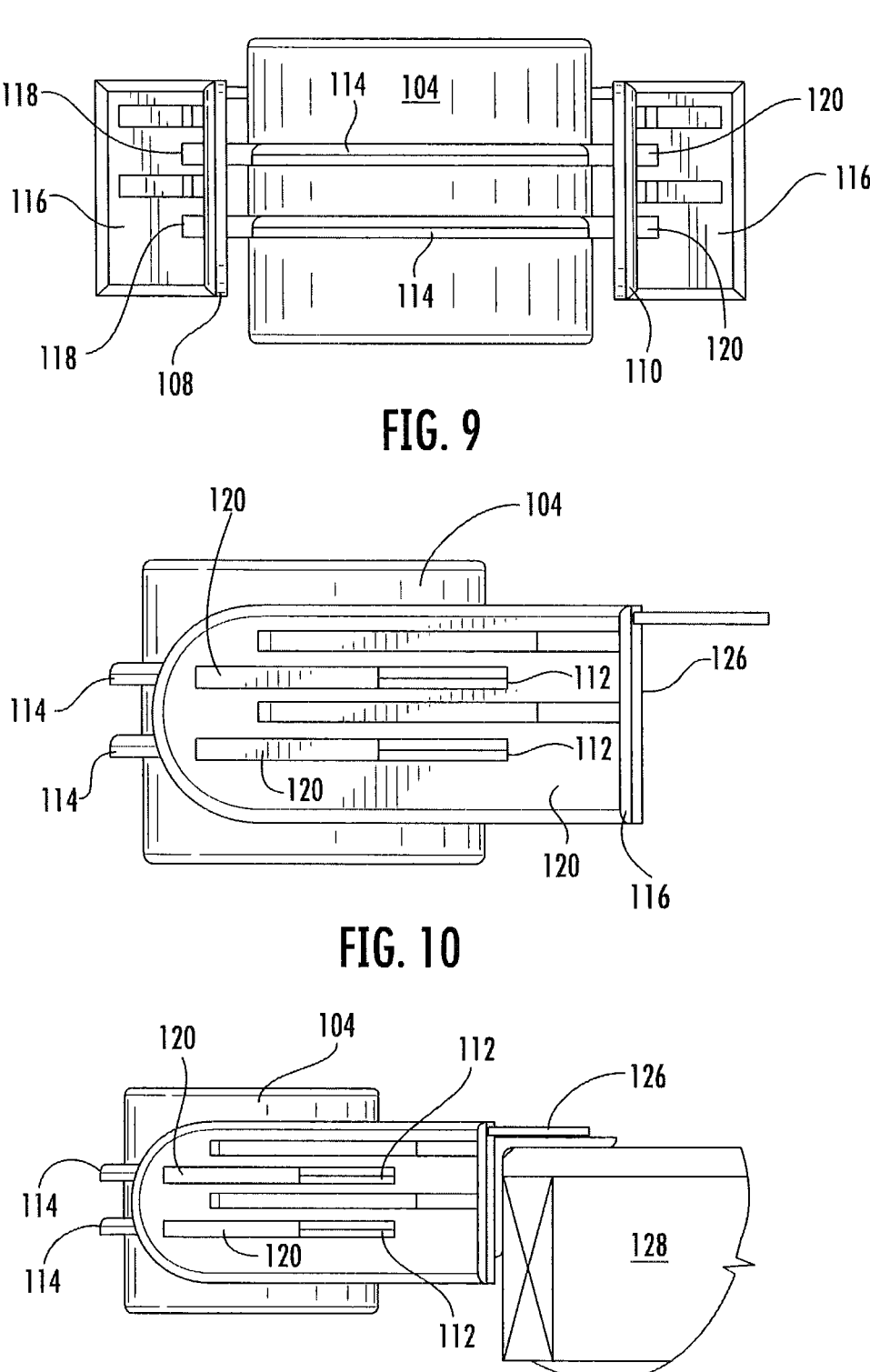
FIG. 9 is a front elevation of the adjustable pile guide of FIG. 8.
FIG. 10 is a side elevation of the adjustable pile guide of FIG. 8.
FIG. 11 is the side elevation of the adjustable pile guide of FIG. 8, and shows one embodiment of the adjustable pile guide mounted to a dock.
Figure 12:
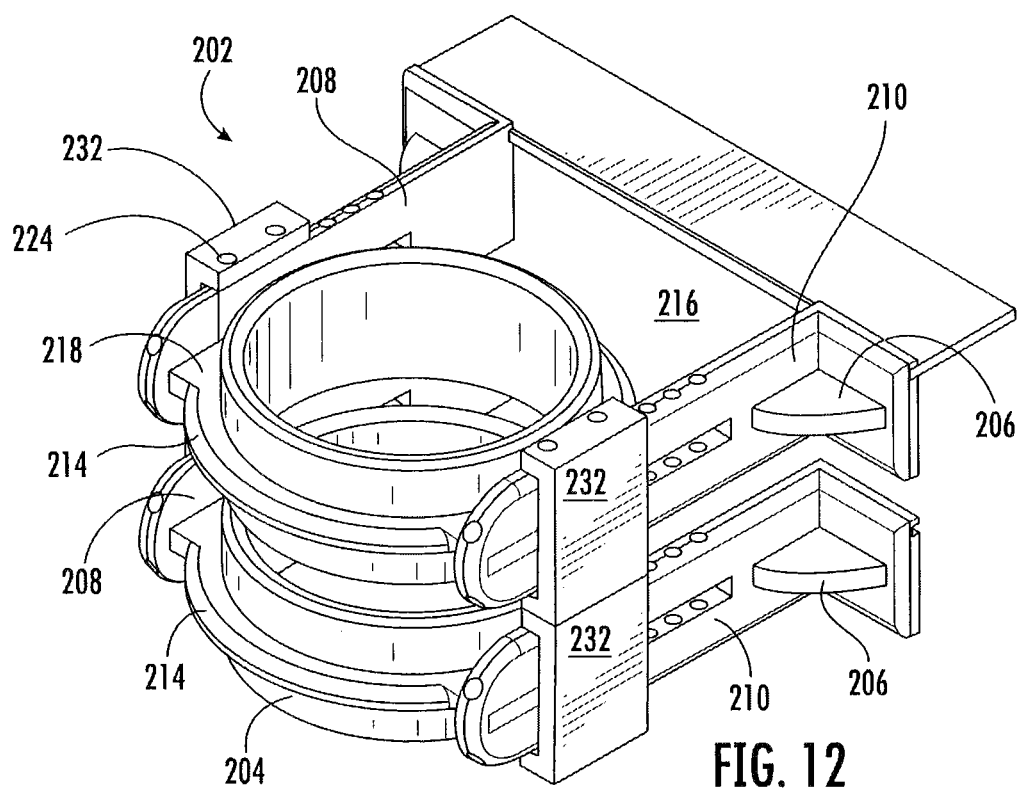
FIG. 12 is a perspective view showing an adjustable pile guide with an adjustable mounting having multiple retainers for the cylinder and multiple wings on each side of the bracket.
Figure 13:
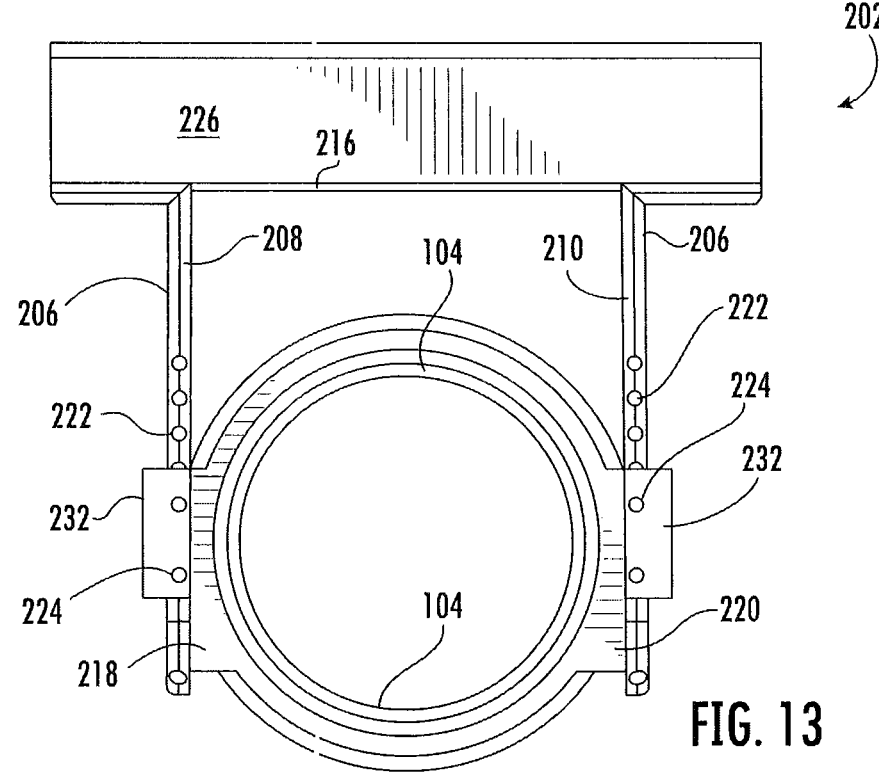
FIG. 13 is a top plan view of the adjustable pile guide of FIG. 12.
Figure 14:
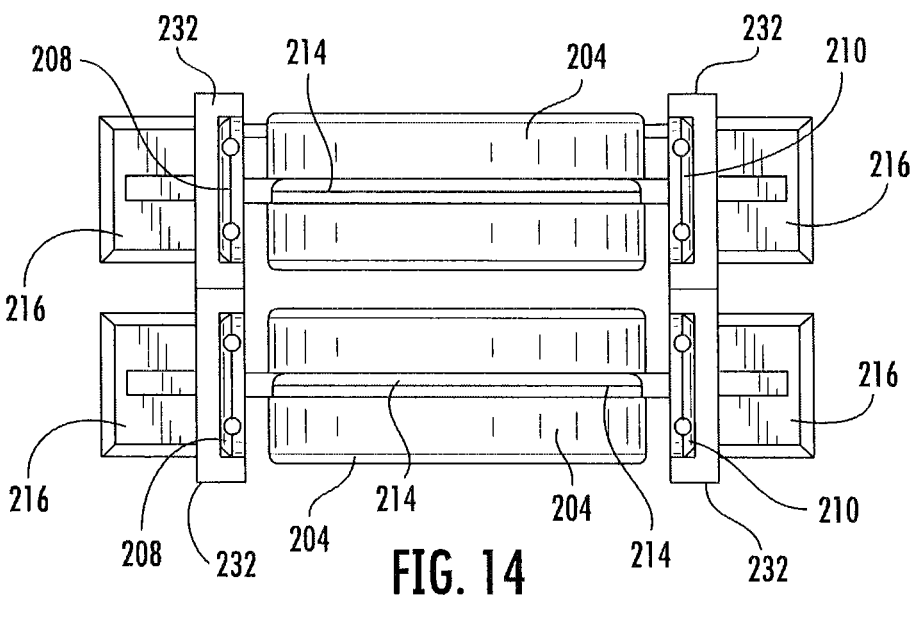
FIG. 14 is a front elevation of the adjustable pile guide of FIG. 12.
Figure 15:
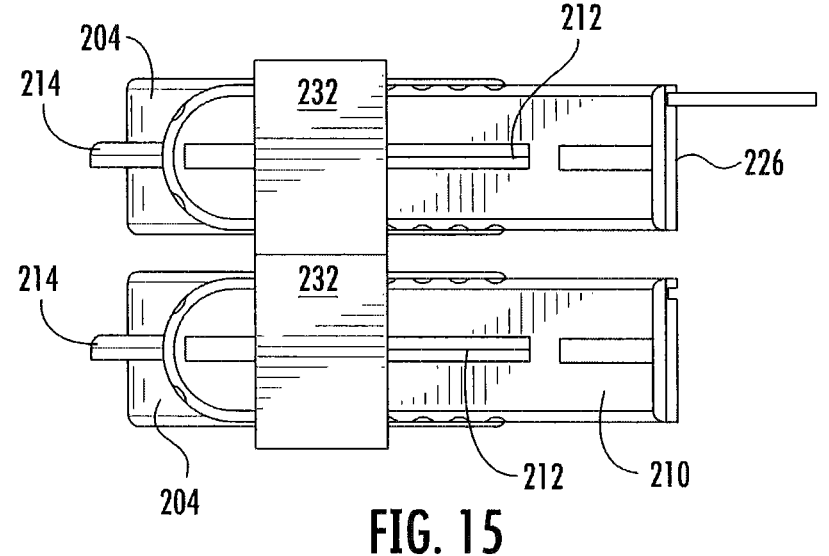
FIG. 15 is a side elevation of the adjustable pile guide of FIG. 12.
Figure 16:
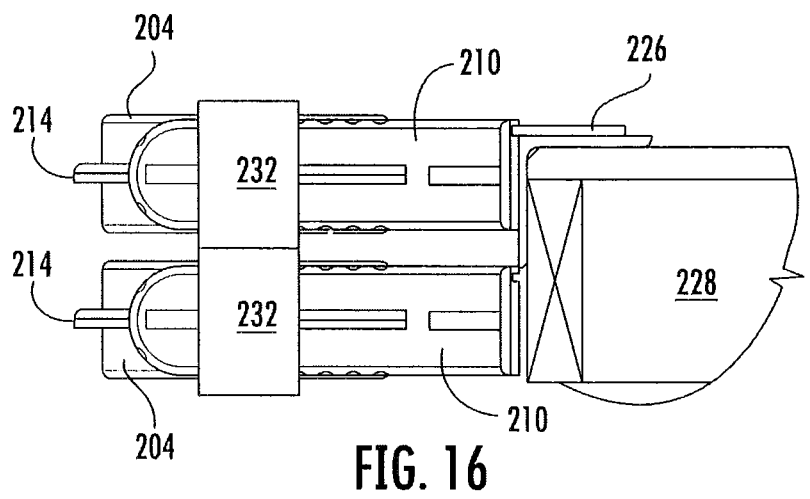
FIG. 16 is the side elevation of the adjustable pile guide of FIG. 12, and showing one embodiment of the adjustable pile guide mounted to a dock.

FIGS. 1-6 show an adjustable pile guide 2 according to an embodiment of the invention. The pile guide comprises a cylinder 4 through which a pile extends when in use. The cylinder is positioned within and held by bracket 6. In this embodiment, the bracket comprises a backing plate 16 that is adjacent to a dock or floating object. Opposing wings 8,10 extend outwardly from the backing plate. Each opposing wing has a slot 12 therein. A retainer, which may be a collar or retainer 14, is attached to the cylinder and positions the cylinder relative to the bracket. The retainer has flanges 18, 20 on each side of the retainer. The flanges are inserted into the slots of the wings, and are slidable within the slots to allow the distance of the cylinder to be adjusted relative to the bracket, including the backing plate.

As shown in the drawings, and in use, a center axis of the aperture of the cylinder 4 extends vertically. The cylinder has an opening that is constructed and arranged to receive a pile that is driven into the earth. The pile extends upwardly from the earth and out of a top surface of water. The pile extends through the opening in the cylinder of the pile guide 2. The cylinder has an inside diameter that is larger than the outside diameter of the pile so that the cylinder has vertical movement relative to the pile. The pile guide is mounted to a floating dock or other floating object 28. The pile and pile guide hold the floating object in its horizontal position in the water, while usually permitting vertical movement of the floating dock as water levels change.

The flanges 18,20 of the retainer are slidable within the slots. The flanges of the retainer are moved within the slots 12 of the opposing wings 8,10, which also moves the cylinder, until the backing plate 16 reaches the floating object (or a bracket attached to the floating object) and can be attached to the floating object. One or more of the plurality of spaced apart apertures 22 in the wings are aligned with one or more apertures (not shown) in the flanges 18,20 of the retainer 14. The plurality of spaced apart apertures 22 are associated with the slots, and as shown, are positioned on the wings and above the slots and the flanges. Once the distance of the pile to the floating object is established, the flanges are secured in position in the slots. In this embodiment a fastener, such as a bolt or screw 30, or a pin, is inserted through the aperture or apertures 22 in the wings that align with the aperture or apertures in the flanges. A mounting bracket 26 may be used to mount the adjustable pile guide to a floating object such as a dock. The mounting bracket as shown has a 90 degree angle, but could in some situations be a flat, vertically oriented plate that mounts to a side of a dock or floating object 28.

FIGS. 7-11 show an adjustable pile guide 102 according to an embodiment of the invention. The pile guide comprises a cylinder 104 through which a pile extends in use. The cylinder is positioned by bracket 106. In this embodiment, the bracket comprises a backing plate 116 that is adjacent to a dock or floating object. Opposing wings 108,110 extend outwardly from the backing plate. Each opposing wing has multiple slots 112 therein. Multiple retainers hold the cylinder in position. In this embodiment, the retainers comprise center members or collars 114 that surround the cylinder. Each retainer has flanges 118,120 on each side of the center member of the retainer. The flanges are inserted into the slots of the wings, and are slidable within the slots to allow the distance of the retainer and cylinder to be adjusted relative to the backing plate.

Each opposing wing as shown in this embodiment has two slots 112, and two sets of apertures 122 for securing the cylinder 104 in position within bracket 106. Two collars 114 surround the cylinder, with each retainer having two flanges 118, 120 extending from opposite sides of the retainer. Each of the four flanges are retained in one of the four slots of the wings. The pile extends through the opening in the cylinder of the adjustable pile guide. The pile guide is mounted to a floating dock or other floating object 128. The pile and adjustable pile guide hold the floating dock in its horizontal position in the water, while usually permitting vertical movement of the floating dock as water levels change. The enlarged wings and multiple retainers, such as the retainers, add strength and redundancy.

The cylinder 104 and retainers 114 are moved within the slots of the opposing wings 108 and 110 until the backing plate 116 and can be attached to the floating object. The retainers are moved within the slots by the flanges 118,120 sliding within the slots in the embodiments shown in all drawings. Moving the retainers moves the attached cylinder. One or more of the plurality of spaced apart apertures 122 in the wings are aligned with one or more of the multiple apertures 124 in the flanges 118, 120 of the retainers. The plurality of spaced apart apertures 122 are associated with the slots 112, and as shown, are positioned on the wings and above the slots and the flanges. Once the distance of the pile to the floating object is established, the four flanges are secured in position relative to the four slots. In this embodiment a fastener 130, such as a bolt or screw, or a pin, is inserted through the aperture or apertures in the wings that align with the aperture or apertures in the flanges. Mounting bracket 126 may be used to mount the adjustable pile guide to a floating object such as a dock.

FIGS. 12 through 16 show an adjustable pile guide 202 according to an embodiment of the invention. The pile guide comprises multiple cylinders 204 through which a pile extends in use. Backing plate 216 is adjacent to the dock. Wings 208, 210 extend from each of opposing sides of the backing plate. Each of the four wings has a slot 212 therein. Retainers connect each cylinder to the wings. The retainer may comprise center members such as collars 214 that surround each cylinder. Each retainer has a flange 218, 220 on each side of the retainer. The flanges are inserted into the slots 212 of the wings. The flanges are slidable within the slots to allow the distance of the retainers and cylinders to be adjusted relative to the floating object 228.

Pile guide 202 is mounted to a floating dock or other floating object 228. The pile and adjustable pile guide hold the floating dock in its horizontal position in the water, while usually permitting vertical movement of the floating dock as water levels change. The cylinder has an inside diameter that allows movement of pile guide relative to the pile.

With a pile in position within the cylinders, the flanges 218,220 of the retainers 214 are moved within the slots 212 of the wings 208,210 until the backing plate 216 reaches the floating object 228 and can be attached to the floating object.

In this embodiment, sliders 232 are attached to the flanges 218, 220 of the retainers. The sliders move along an outside surface of the wings. Other embodiments as described above could have sliders for movement of the retainers and cylinders.

One or more of the plurality of spaced apart apertures 224 in the sliders are aligned with one or more of the plurality of apertures 222 in wings. The plurality of apertures in the wings may be formed in the tops of the wings. The apertures are aligned with the apertures in the sliders, such as the tops of the sliders. Once the distance of the pile to the floating object is established, the flanges are secured in position relative to the slots. A fastener, such as a bolt or screw, or a pin, is inserted through the aligned aperture or apertures 222,224 in the sliders and the wings. A mounting bracket 226 may be used to mount the adjustable pile guide to a floating object such as a dock.

Figure 17:
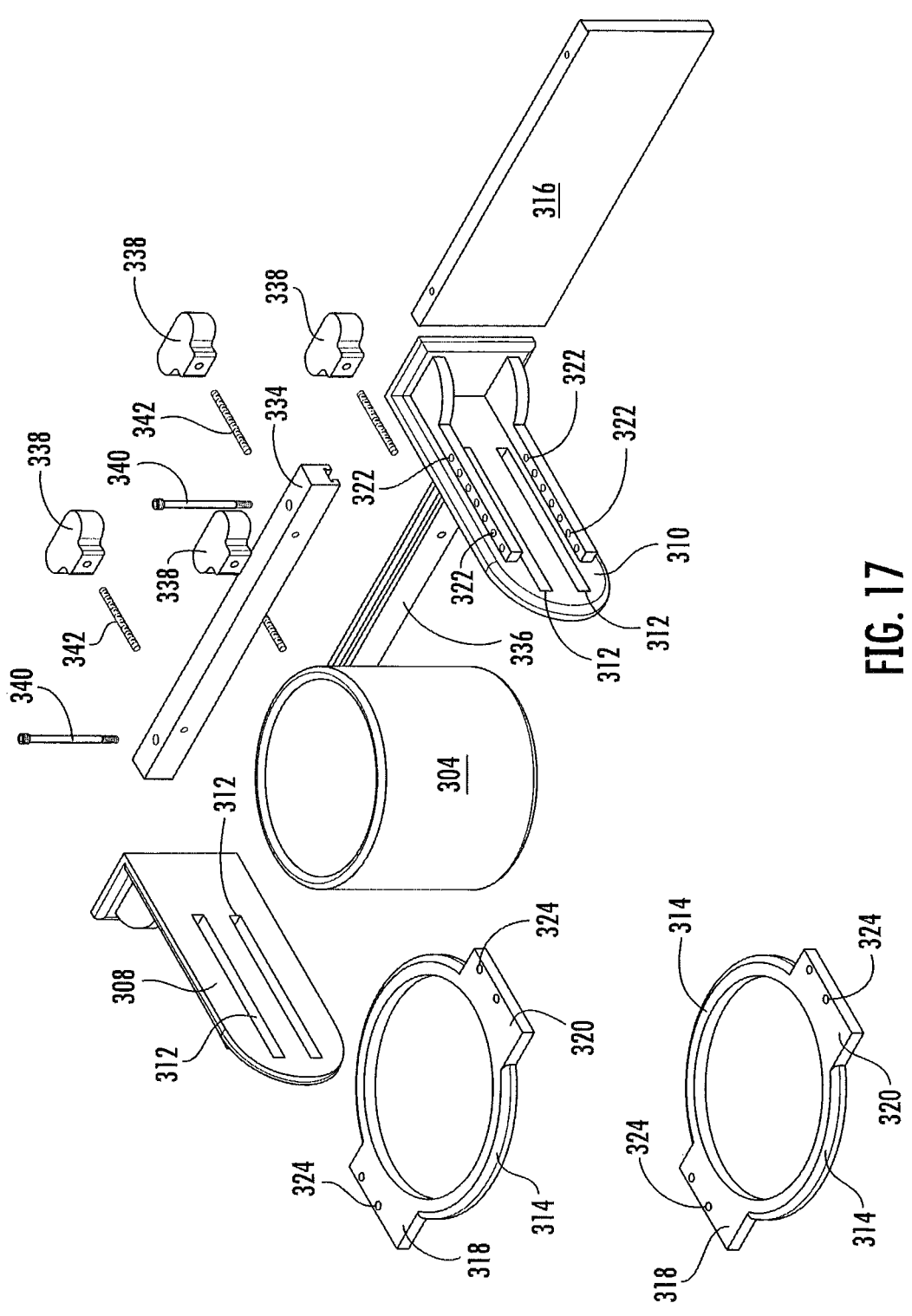
FIG. 17 is an exploded view of an embodiment of the adjustable pile guide having multiple retainers.

FIG. 17 is an exploded view of an embodiment of the pile guide that is similar to the embodiment of FIGS. 7 through 11. This embodiment of the pile guide 302 has a backing plate 316 with a top and bottom mounting bar 334, 336. The backing plate is positioned between the top and bottom mounting bar, and may be attached with fasteners 340. Wings 308, 310 are mounted to the backing plate that is mounted to a floating object. Mounts 338 may be attached to the floating object, and the top and bottom bar and/or the backing plate may be attached to the mounts with fasteners 342. In the embodiment shown, multiple retainers 314 for the cylinder are shown. The retainers surround the cylinder 304 in this embodiment. Flanges 318,320 of the retainers are inserted in the slots 312 and slide within the slots to adjust the distance between the retainers and cylinder and the floating object. Fasteners such as a screw or a pin may be used to hold the retainers and cylinder in place once the distance between the pile and the dock is accounted for by inserting fastener(s) in apertures in the aligned apertures 322, 324 in the flanges 308, 310.

The wings in each embodiment may be L shaped with gussets between the sides forming the L. The gussets add strength to the wings. The wings are in a generally vertical orientation in each embodiment, that is, the height is substantially greater than the width, with a slot or slots formed in the wings. The slots permit the flanges of the retainer to slide within the slots to allow generally horizonal movement of the cylinder. The slots are formed as elongated voids in the wings in the embodiments shown. The formation of the slots as shown results in slots that are closed on each end, and on top and bottom, to keep the retainer within the wings.

The retainer is preferred to have a center member, with the flanges extending from the center member on opposite sides of the center member. The center member surrounds the cylinder to hold the cylinder. The cylinder could have cross section that is not round depending on the application. A rectangular pile could use a rectangular cylinder.

The pile guide in all embodiments is preferred to be formed of thermoplastic and even more preferred to be formed of polyethylene or high-density polyethylene. High density polyethylene is impact resistant, has a low coefficient of friction and permits the flanges to slide easily within the slots of the adjustable pile guide. The pile guide may be formed of other impact resistant plastics or thermoplastics, such as medium density polyethylene. The mounting bracket may be formed of corrosion resistant materials. Thermoplastic such as polyethylene or high-density polyethylene, as well as aluminum or stainless steel, which are corrosion resistant in water and saltwater, may be used as preferred according to the application.

5

What is claimed:

1. A pile guide construct for floating docks, the pile guide comprising:

a cylinder having a central aperture therein constructed to receive and hold a pile within the central aperture of the cylinder, a first flange extending from a first side of the cylinder and a second flange extending from a second side of the cylinder, wherein the first flange and the second flange have a construct that is substantially symmetrical, a first wing and a second wing, the wings positioned on opposite sides of the cylinder, the first wing and the second wing extending outwardly and generally parallel to each other, the first flange positioned transversely across and extending through an elongated slots of the first wings perpendicular to the elongated slot of the first wing and the second flange positioned transversely across and extending through an elongated slot of the second wing perpendicular to the elongated slot of the second wing, and a first elongated securing member that extends from the first wing and a second elongated securing member that extends from the second wing, wherein the first elongated securing member is generally parallel to the elongated slot formed in the first wing and the second elongated securing member is generally parallel to the elongated slot formed in the second wing, and the first elongated securing member is secured to a portion of the first flange that extends through the elongated slot to an opposite side of the first wing.

2. The pile guide construct for floating docks as described in claim 1, wherein the first elongated securing member wing and the second elongated securing member each have a plurality of apertures formed therein, one of the plurality of apertures of each of the first elongated securing member and the second elongated securing member is constructed and arranged to selectively align with an aperture of one of the flanges.

3. The pile guide construct for floating docks as described in claim 1, further comprising a backing plate, and wherein the first wing and the second wing are connected to the backing plate, and the backing plate is constructed and arranged to mount to a side and a top surface of a floating dock.

4. The pile guide construct for floating docks as described in claim 1, wherein the elongated slot of the first wing is constructed and arranged to limit horizontal movement of the first flange sliding within the elongated slot of the first wing.

5. The pile guide construct for floating docks as described in claim 1, wherein the elongated slot in the first wing is closed on opposite ends to limit horizontal movement of the first flange sliding within the elongated slot.

6. The pile guide construct for floating docks as described in claim 1, further comprising a slider attached to the first flange, the slider constructed and arranged to move along an outside-surface of the slot of the first wing.

7. The pile guide construct for floating docks as described in claim 1, further comprising a slider attached to the first flange, the slider constructed and arranged to move along an outside surface of the first wing, the slider having an aperture formed therein constructed and arranged to align with an aperture formed in the first elongated securing member.

8. The pile guide construct as described in claim 1, wherein the first elongated securing member is attached to the portion of the first flange that extends beyond the elongated slot of the first wing and at a selected position to secure the cylinder at a selected position relative to a mounting bracket.

9. The pile guide construct as described in claim 1, further comprising a mounting bracket constructed and arranged to mount an end of the pile guide construct to a floating dock.

10. The pile guide construct for floating docks as described in claim 1, wherein the first elongated securing member comprises an aperture formed therein and a fastener present in said aperture that connects the first wing to the first flange.

11. The pile guide construct for floating docks as described in claim 1, wherein the first elongated securing member comprises a plurality of apertures formed therein, the plurality of apertures constructed and arranged to align with an aperture of the first flange, and a fastener present in an aperture of the plurality of apertures of the first elongated securing member and the aperture of the first flange that connects the first wing to the first flange.

12. A pile guide construct for floating docks, the pile guide comprising:

a cylinder having a central aperture therein constructed to receive and hold a pile within the central aperture of the cylinder, wherein the central aperture comprises uniformly smooth surfaces facilitating the cylinder to traverse the pile, a first wing and a second wing, the wings positioned on opposite sides of the cylinder, the first wing and the second wing extending outwardly and generally parallel to each other, the first wing having an elongated slot formed therein and the second wing having an elongated slot formed therein, a first flange extending laterally from a first side of the cylinder and toward the first wing and extending transversely through the elongated slot of the first wing and a second flange extending laterally from a second side of the cylinder that is opposite the first side and toward the second wing and extending transversely through the elongated slot of the second wing, wherein the flanges are substantially symmetrical, and wherein the cylinder is positioned relative to a floating dock and the pile contained within the cylinder by sliding the first flange and the second flange in the slots to a position that aligns an aperture of the first wing with an aperture of the first flange and inserting a fastener through the aperture of the first flange and the aperture of the first wing.

13. The pile guide construct for floating docks as described in claim 12, wherein the elongated slot of the first wing is constructed and arranged to limit horizontal movement of the first flange sliding within the elongated slot of the first wing.

14. The pile guide construct for floating docks as described in claim 12, further comprising a backing plate, and wherein the first wing and the second wing are connected to the backing plate, and the backing plate is constructed and arranged to mount to a side and a top surface of a floating dock.

15. The pile guide construct for floating docks as described in claim 12, wherein the elongated slot in the first wing is closed on opposite ends to limit horizontal movement of the first flange sliding within the elongated slot.

16. The pile guide construct for floating docks as described in claim 12, further comprising a slider attached to the first flange, the slider constructed and arranged to move along an outside of the slot of the first wing.

17. The pile guide construct for floating docks as described in claim 12, further comprising a slider attached to the first flange, the slider constructed and arranged to move along an outside surface of the first wing, the slider having an aperture formed therein constructed and arranged to align with the aperture formed in the first wing.

18. The pile guide construct as described in claim 12, further comprising a first elongated securing member attached to a portion of the first flange that extends beyond the elongated slot of the first wing and at a selected position to secure the cylinder at a selected position relative to a mounting bracket.

19. The pile guide construct as described in claim 12, wherein the first wing and the second wing are secured to a mounting bracket that is constructed and arranged to mount to a floating dock at an end of the pile guide.

20. The pile guide construct as described in claim 12, wherein the first wing and the second wing each comprise a plurality of enclosed apertures, and the cylinder is positioned relative to a floating dock and the pile contained within the cylinder by sliding the first flange and the second flange in the slots to a position that aligns an aperture of the plurality of apertures of the first wing with the aperture of the first flange and inserting the fastener through the aperture of the first flange and the aperture of the plurality of apertures of the first wing.

\* \* \* \* \*